(12) United States Patent
Friend et al.

(10) Patent No.: US 10,926,743 B2
(45) Date of Patent: Feb. 23, 2021

(54) DEVICES AND METHODS FOR SUPPORTING A SHOCK ABSORBER OF A REAR SUSPENSION MEMBER

(71) Applicant: Toyota Motor Engineering & Manufacturing North America, Inc., Plano, TX (US)

(72) Inventors: Ronald Scott Friend, Jeffersonville, KY (US); Robert Aaron Allex, Ewing, KY (US); Brian McElroy, Winchester, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 67 days.

(21) Appl. No.: 16/383,188

(22) Filed: Apr. 12, 2019

(65) Prior Publication Data
US 2020/0324742 A1    Oct. 15, 2020

(51) Int. Cl.
*B60S 11/00*   (2006.01)

(52) U.S. Cl.
CPC .................................... *B60S 11/00* (2013.01)

(58) Field of Classification Search
CPC ........................................................ B60S 11/00
See application file for complete search history.

(56) References Cited

U.S. PATENT DOCUMENTS

| | | | | |
|---|---|---|---|---|
| 3,712,653 A | * | 1/1973 | Lehmann | E05B 65/0817 52/582.2 |
| 5,246,391 A | * | 9/1993 | Seidler | H01R 12/57 439/693 |
| 5,636,819 A | * | 6/1997 | Kettlestrings | F16L 3/243 248/216.1 |
| 5,816,558 A | * | 10/1998 | Sommer | A01K 39/00 248/544 |
| 5,896,722 A | * | 4/1999 | Swenson | E04C 5/163 403/391 |

(Continued)

FOREIGN PATENT DOCUMENTS

| | | |
|---|---|---|
| CN | 106274351 A | 1/2017 |
| JP | 2007118889 A | 5/2017 |

OTHER PUBLICATIONS

"Plastic C-Clip" (http://www.plastrip.co.za/product/plastic-c-clip/). Accessed Date: Jan. 4, 2019.

(Continued)

*Primary Examiner* — Darlene P Condra
(74) *Attorney, Agent, or Firm* — Dinsmore & Shohl LLP

(57) ABSTRACT

A shock absorber support device for supporting a shock absorber coupled to a rear suspension member (RSM), the shock absorber support device including an elongated body extending between a first end and a second end. A shock absorber hooking portion is coupled to the first end, where the shock absorber hooking portion is configured to releasably engage a cylinder of a shock absorber. An RSM frame hooking portion is coupled to the second end, where the RSM frame hooking portion is configured to releasably engage a portion of an RSM frame assembly. Engagement of both the shock absorber and the portion of an RSM frame assembly prevents the shock absorber from moving.

8 Claims, 5 Drawing Sheets

(56) References Cited

U.S. PATENT DOCUMENTS

| | | | |
|---|---|---|---|
| 6,018,879 | A | 2/2000 | Carder |
| 6,182,934 | B1 * | 2/2001 | Kelley .................... A47G 1/18 |
| | | | 248/302 |
| 7,021,703 | B2 | 4/2006 | Yamaguchi et al. |
| 8,388,022 | B2 | 3/2013 | Kusiak et al. |
| 10,118,452 | B2 | 11/2018 | Drotar et al. |

OTHER PUBLICATIONS

"C-Hook" (https://www.vkf-renzel.si/c-kavelj/). Accessed Date: Jan. 4, 2019.

* cited by examiner

DEVICES AND METHODS FOR SUPPORTING A SHOCK ABSORBER OF A REAR SUSPENSION MEMBER

TECHNICAL FIELD

The present specification generally relates to shock absorber support devices and methods and, more specifically, to shock absorber support devices and methods to hold a shock absorber of a rear suspension member in a predetermined position as the rear suspension member is assembled to a vehicle body.

BACKGROUND

During assembly of a vehicle, a rear suspension member (RSM) with shock absorber(s) is assembled prior to attachment of the RSM to a body of the vehicle. For example, the RSM with attached left and right shock absorbers may be aligned beneath a body of a vehicle and inserted into the body of the vehicle from below and attached to the body of the vehicle. Currently, nylon jigs may be used to hold the shock absorbers out from the tire walls or other components of the vehicle body to prevent accidental contact between the shock absorbers and the vehicle body. However, the nylon jigs have been found to fall out easily before attachment of the RSM to the body of the vehicle and are difficult to remove after attachment.

Accordingly, there is a need for shock absorber support devices and methods for supporting a shock absorber that are reliable when placed and can be easily removed upon completion of assembly.

SUMMARY

In one embodiment, a shock absorber support device for supporting a shock absorber coupled to a rear suspension member (RSM), the shock absorber support device including an elongated body extending between a first end and a second end. A shock absorber hooking portion is coupled to the first end, where the shock absorber hooking portion is configured to releasably engage a cylinder of a shock absorber. An RSM frame hooking portion is coupled to the second end, where the RSM frame hooking portion is configured to releasably engage a portion of an RSM frame assembly. Engagement of both the shock absorber and the portion of an RSM frame assembly prevents the shock absorber from moving.

In another embodiment, a method of supporting a shock absorber coupled to a rear suspension member (RSM) during assembly of the RSM to a body of a vehicle, the method including providing a shock absorber support device. The shock absorber support device includes an elongated body extending between a first end and a second end, a shock absorber hooking portion coupled to the first end, and an RSM frame hooking portion coupled to the second end. The method further includes engaging a cylinder of the shock absorber with the shock absorber hooking portion, and engaging a portion of an RSM frame assembly of the RSM with the RSM frame hooking portion prevents the shock absorber from moving.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
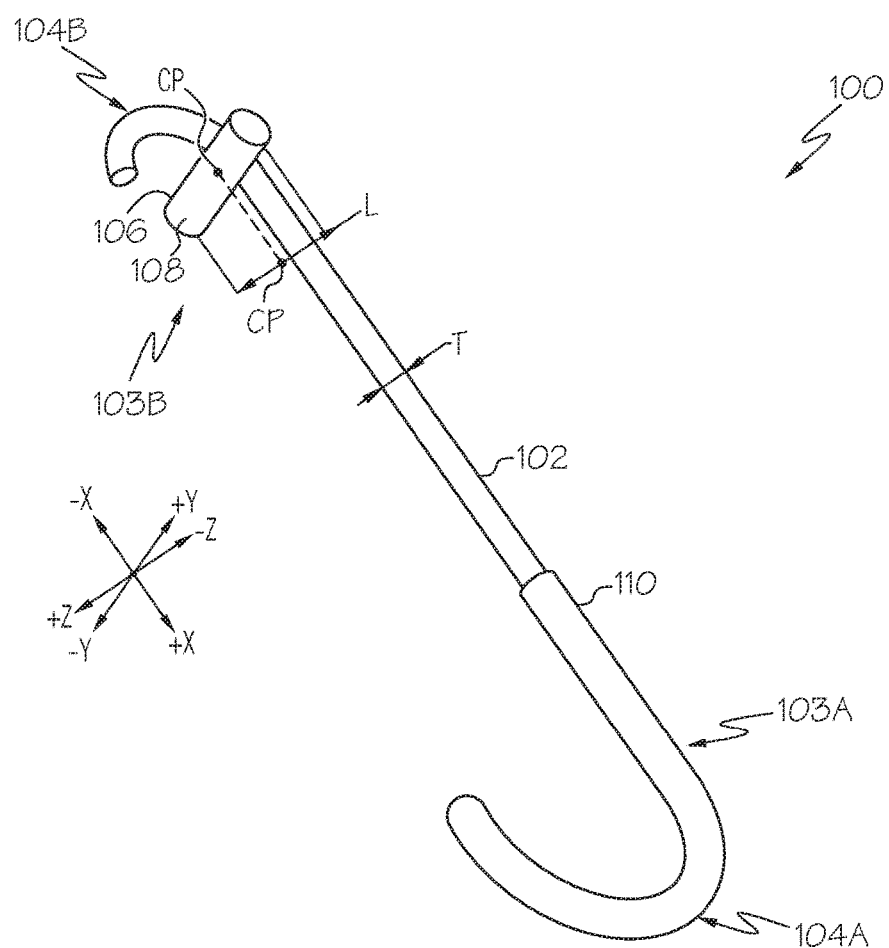
FIG. 1 depicts a perspective view of a shock absorber support device, according to one or more embodiments shown or described herein.

FIG. 1 generally depicts an embodiment of a shock absorber support device for holding a shock absorber of a rear suspension member (RSM) in a predetermined position during assembly of a vehicle. The shock absorber support device generally includes an elongated body extending between a first end and a second end. A shock absorber hooking portion is coupled to the first end of the elongated body. The shock absorber hooking portion is configured to releasably engage a cylinder of the shock absorber. In some embodiments, the shock absorber hooking portion may be coated in a non-abrasive coating to prevent surface defects on the shock absorber cylinder. An RSM frame hooking portion is coupled to the second end and configured to releasably engage a portion of the RSM frame assembly. The hook design of the shock absorber hooking portion and the RSM frame hooking portion may inhibit the shock absorber support device from becoming dislodged during the assembly of the RSM to the vehicle body. For example, the shock absorber may be pivotally secured to an RSM frame of the RSM at a pivot point. A natural inclination of an unsupported shock absorber may be to pivot toward the ground about the pivot point. Accordingly, when the shock absorber support device is assembled to both the RSM frame and the shock absorber, the shock absorber support device may be placed in tension by the pivoting motion of the shock absorber, which may reliably secure the shock absorber at a predetermined position. That is, the engagement of both the shock absorber and the portion of the RSM frame assembly with the shock absorber support device holds the shock absorber at a predetermined position. Various embodiments of the shock absorber support device and methods will be described in greater detail herein.

Figure 2:
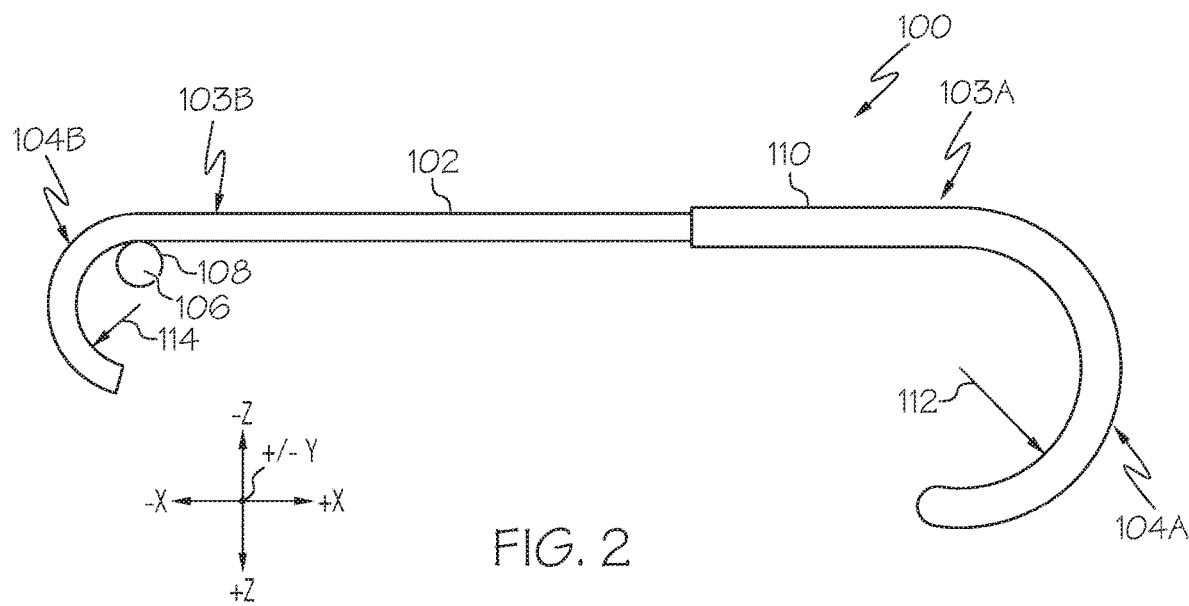
FIG. 2 schematically depicts a top view the shock absorber support device of FIG. 1 as viewed along the +/−Z-axis of the depicted coordinate axes, according to one or more embodiments shown or described herein.

Referring now to FIGS. 1 and 2, an embodiment of a shock absorber support device 100 is generally depicted. As illustrated, the shock absorber support device 100 may include an elongated body 102, a shock absorber hooking portion 104A, an RSM frame hooking portion 104B, and an anti-rotation tab 106. As will be described in greater detail herein with respect to FIGS. 3A-5, the shock absorber support device 100 is configured to be coupled to a shock absorber 202 and an RSM frame assembly 201 of an RSM 200 to arrange the shock absorber 202 at a predetermined position relative to the RSM frame assembly 201 to prevent the shock absorber 202 from contacting a vehicle body 220, painted surfaces 222, wheel well 224 (e.g., the inner tire wall), or car door 226 during assembly of the RSM 200 to the vehicle body 220.

Referring again to FIGS. 1 and 2, the elongated body 102 may include a first end 103A and a second end 103B. As will be described in greater detail herein and with reference to FIGS. 3-5, when coupled to a shock absorber 202 and an RSM frame assembly 201 of an RSM 200, the elongated body 102 holds the shock absorber 202 in a predetermined position such that the first end 103A of the elongated body 102 is coupled to the shock absorber 202 and the second end 103B of the elongated body 102 is coupled to the RSM frame assembly 201. As illustrated, when mounted to the RSM frame assembly 201 and shock absorber 202, the elongated body 102 may be arranged between the shock absorber hooking portion 104A and the RSM frame hooking portion 104B. To facilitate such arrangement, and with reference to FIGS. 1 and 2, the elongated body 102 may include shock absorber hooking portion 104A coupled to the first end 103A and an RSM frame hooking portion 104B coupled to the second end 103B. In one non-limiting embodiment, the RSM frame hooking portion 104B is bent at a 75 degree angle relative to the elongated body 102, and the overall length of the shock absorber support device 100 is 180 mm.

It is noted that the shock absorber support device 100 (e.g., the elongated body 102, the shock absorber hooking portion 104A, and/or the RSM frame hooking portion 104B) may be made from a variety of materials. For example, in one non-limiting embodiment the elongated body 102 is made from a metal rod (e.g., 5/16 in. steel rod) having a thickness T. Such rod may have various cross-sections including, but not limited to circular, ovoid, rectangular, triangular, or other regular or irregular polygonal shapes. In some embodiments, the elongated body 102, the shock absorber hooking portion 104A, and/or the RSM frame hooking portion 104B are made from an integral piece of rigid material, or several pieces welded together.

Referring again to FIG. 2, the shock absorber hooking portion 104A may have an inner radius 112, and the RSM frame hooking portion 104B may have an inner radius 114. In some embodiments, the inner radius 112 is larger than the inner radius 114, the inner radius 112 is smaller than the inner radius 114, or the inner radius 112 is the same size as the inner radius 114. Additionally, in some embodiments, inner radius 112 may be about 45 mm to about 51 mm. However, it is contemplated that the inner radius 112 may be any radius length that is operable to engage a particular shock absorber (e.g., larger or smaller shock absorbers). It should be appreciated that when the shock absorber hooking portion 104A is engaged with a shock absorber 202, the inner radius 112 of the shock absorber hooking portion 104A corresponds to the outer radius 205 of the shock absorber 202 to ensure a close (e.g., tight) fit to prevent the shock absorber 202 from coming loose during the assembly process.

In one non-limiting embodiment, the RSM frame hooking portion 104B may have a rounded hook shape as illustrated. For example, the RSM frame hooking portion may be bent relative to the elongated body 102. For example, the RSM frame hooking portion 104B may be bent between about 50 and about 90 degrees (e.g., about 75 degrees) relative to the elongated body 102.

It is noted that while the overall length of the shock absorber support device 100 may be any length depending on the particular application. In some embodiments, the overall length of the shock absorber support device may be between about 150 mm and about 200 mm (e.g., about 180 mm.

The elongated body 102 may further include a non-abrasive coating 110 arranged on the shock absorber hooking portion 104A. The non-abrasive coating 110 may prevent surface defects when the shock absorber hooking portion 104A is coupled to a component, such as a shock absorber 202. It is noted that the non-abrasive coating 110 may be made from a variety of materials. For example, in one non-limiting embodiment the non-abrasive coating 110 is made from rubber. The non-abrasive coating 110 may fully coat the shock absorber hooking portion 104A, and partially extend along the elongated body 102.

In some embodiments, the shock absorber support device 100 may further include an anti-rotation tab 106. The anti-rotation tab 106 may be coupled to the elongated body 102 at the second end 103B proximate to the RSM frame hooking portion 104B. The anti-rotation tab 106 may extend from the elongated body 102 in the +Z direction so as to be placed on an interior of the curve of the RSM frame hooking portion 104B. In embodiments, and as illustrated in FIG. 1, the anti-rotation tab 106 may extend in both the +/−Y direction so as to extend beyond the elongated body 102 in the +/−Y direction. For example, the anti-rotation tab 106 may have a length L, having a center point CP, which is equidistant from either distal end of the anti-rotation tab 106. The anti-rotation tab 106 may be coupled to the elongated body 102 such that a length L of the anti-rotation tab 106 is perpendicular to a length direction (i.e., the +/−X direction of the depicted coordinate axes) of the elongated body 102. However, other angular arrangements between the elongated body 102 and anti-rotation tab 106 are contemplated and possible. The length L of the anti-rotation tab 106 may be greater than the thickness T of the elongated body 102. In some embodiments, the anti-rotation tab 106 may be secured to the elongated body 102 at center point such that the anti-rotation tab 106 extends perpendicularly outward past the elongated body 102 along the +/−Y-axis at a length of (L−T)/2 from the center point CP on both sides of the anti-rotation tab 106.

The anti-rotation tab 106 can be made from the same material as the elongated body 102, and can be integral with the elongated body 102. In some embodiments, the anti-rotation tab 106 is coupled to the elongated body 102 through, e.g., welding, brazing, or the like.

Referring now to FIGS. 3A-5, an embodiment of an RSM 200 is generally depicted. As illustrated, the RSM 200 may include an RSM frame assembly 201 and a shock absorber 202 coupled to the RSM frame assembly 201. The RSM frame assembly 201 may include an RSM frame 206, an RSM upper arm 208 (e.g., an RSM shock absorber tower), and a wheel assembly 210. As noted above, the shock absorber support device 100 may be used to hold the shock absorber 202 in a predetermined position during the assembly process.

In some embodiments, shock absorber 202 may include lower cylinder 203A and upper cylinder 203B. The lower cylinder 203A of the shock absorber 202 may be pivotally connected to the RSM frame 206 by a bolt 212 (or pin) at a pivot point 213, with the upper cylinder 203B of the shock absorber 202 unsecured. It is noted that once the RSM 200 is secured to a vehicle body 220, the upper cylinder 203B of shock absorber 202 may be secured to a vehicle body 220 by a bracket 218 (illustrated in FIG. 5). When using the shock absorber support device 100, the shock absorber hooking portion 104A may be coupled to (e.g., hooked around) the lower cylinder 203A of the shock absorber 202. For example, the lower cylinder 203A may have an outer radius 205. This outer radius may correspond to the inner radius 112 of the shock absorber hooking portion 104A to allow the shock absorber hooking portion 104A to hook around and securely hold the lower cylinder 203A. In some embodiments, the inner radius 112 of the shock absorber hooking portion 104A may be the same or slightly smaller than the outer radius 205 of the lower cylinder 203A to provide a more secure holding force between the shock absorber hooking portion 104A and the lower cylinder 203A. In embodiments including the non-abrasive coating 110, the non-abrasive coating 110 contacts the lower cylinder 203A of the shock absorber 202 so as not to scratch or cause inadvertent defects to an outer surface 204 of the lower cylinder 203A.

It should be noted that in some embodiments, the shock absorber hooking portion 104A may instead be coupled to the upper cylinder 203B.

In some embodiments, the RSM upper arm 208 may be secured to the RSM frame 206 by bolt 207. In other embodiments the RSM upper arm 208 is coupled to the RSM frame 206 through welding, brazing, soldering, or other fastening techniques. The RSM upper arm 208 may provide additional support to the RSM frame 206 after the RSM 200 is secured to the vehicle body 220. The RSM upper arm 208 may be secured to the RSM frame 206, and a gap G may be formed between the RSM frame 206 and RSM upper arm 208. The gap G may allow for the RSM frame hooking portion 104B to be inserted within the gap G in order to couple to the RSM frame 206 to anchor the shock absorber support device 100 to the RSM frame assembly 201.

Figure 3A:
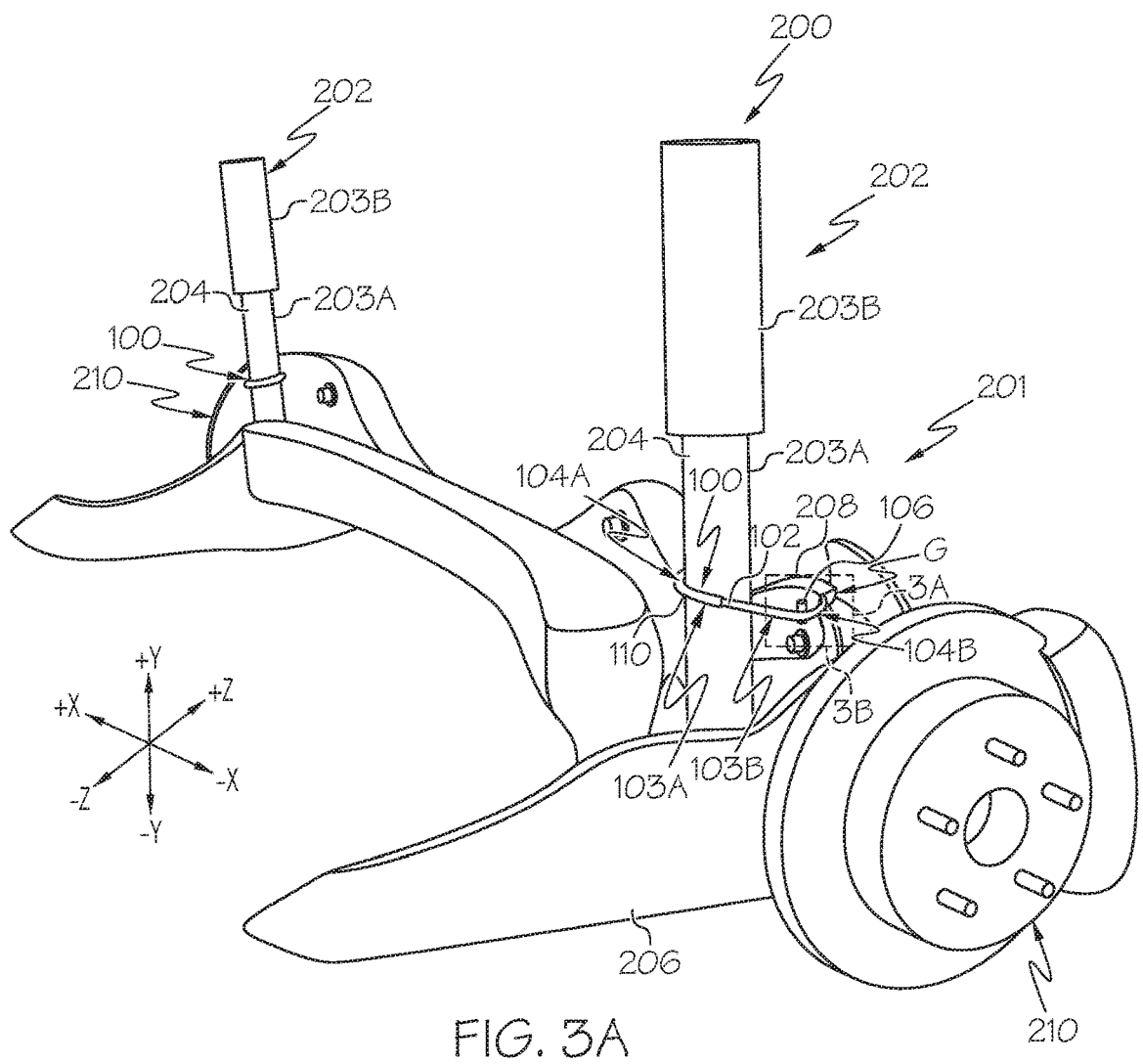
FIG. 3A schematically depicts the shock absorber support device of FIG. 1 coupled to an RSM frame assembly and a shock absorber of an RSM, according to one or more embodiments shown or described herein.
Figure 3B:
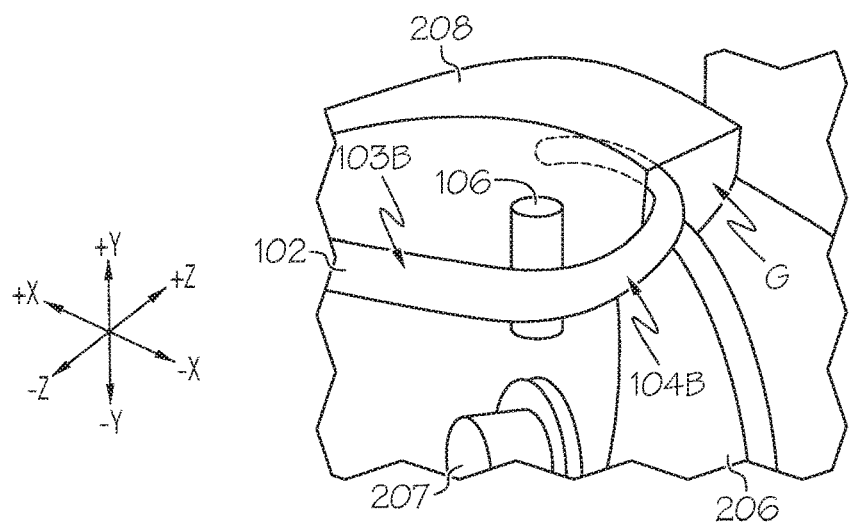
FIG. 3B schematically depicts an enlarged view of the shock absorber support device of FIG. 1 coupled to the RSM frame assembly and the shock absorber of FIG. 3A, according to one or more embodiments shown or described herein.

Referring now to FIG. 3B, which is an enlarged view of area 3A shown in FIG. 3A, the RSM frame hooking portion 104B may be inserted into the gap G and hooked around an edge of the RSM upper arm 208 or other portion of the RSM frame 206. The portion of the RSM frame hooking portion 104B that is inserted within the gap G is shown as dotted lines in FIGS. 3B and 4. Once the RSM frame hooking portion 104B is inserted within the gap G, the outer surface 108 of the anti-rotation tab 106 may abut against the RSM frame 206 or RSM upper arm 208 of the RSM frame assembly 201. The anti-rotation tab 106 is configured to prevent rotation of the elongated body 102 after both the shock absorber hooking portion 104A and RSM frame hooking portion 104B are removably coupled to the lower cylinder 203A and the RSM frame 206, respectively.

As noted above, the shock absorber 202 is pivotally coupled to the RSM frame 206. The shock absorber support device 100 may prevent unwanted rotation of the shock absorber 202 about its pivot point 213 during assembly of the RSM 200 to the vehicle body 220. In use, after the shock absorber 202 is secured to the RSM frame 206, the shock absorber hooking portion 104A of the shock absorber support device 100 is removably coupled to the lower cylinder 203A of the shock absorber 202. While the shock absorber hooking portion 104A is removably coupled to the lower cylinder 203A, the shock absorber 202 is pivoted as to allow the RSM frame hooking portion 104B to be coupled to (e.g., hooked around) the RSM frame 206 by inserting the RSM frame hooking portion 104B within the gap G. Once the RSM frame hooking portion 104B is inserted within gap G, and with the shock absorber hooking portion 104A still coupled to the lower cylinder 203A, the shock absorber 202 can be pivoted away from the RSM upper arm 208 at pivot point 213 in direction 213A and direction 213B. This pivoting action of the shock absorber 202, e.g., due to gravity or an operator acting on the pivoting connection between the shock absorber 202 and the RSM frame 206, places tension on the shock absorber support device 100. Once placed in tension, the anti-rotation tab 106 may prevent further rotation of the shock absorber 202 about its pivot point 213.

In some embodiments, this tension creates a force that prevents the shock absorber hooking portion 104A from becoming dislodged from the lower cylinder 203A, and prevents the RSM frame hooking portion 104B from becoming dislodged from the RSM frame 206 during the assembly process. While the shock absorber 202 is in this position, the shock absorber 202 is at an angle that allows for the RSM 200 to be lifted into the vehicle body 220 without additional or unwanted movement of the shock absorber 202.

Figure 4:
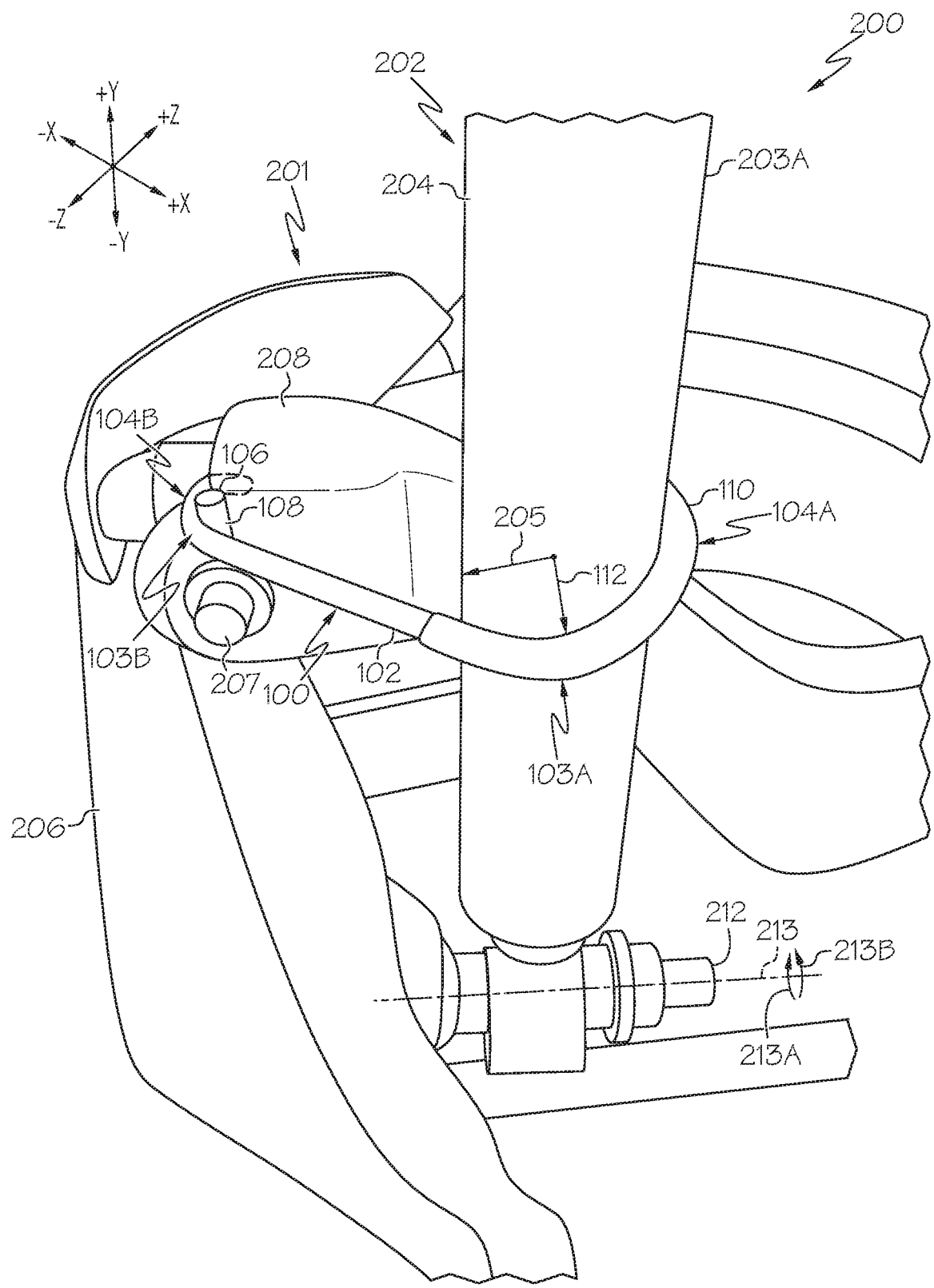
FIG. 4 schematically depicts the shock absorber support device of FIG. 1 coupled to the RSM frame assembly and the shock absorber of FIG. 3A, according to one or more embodiments shown or described herein.
Figure 5:
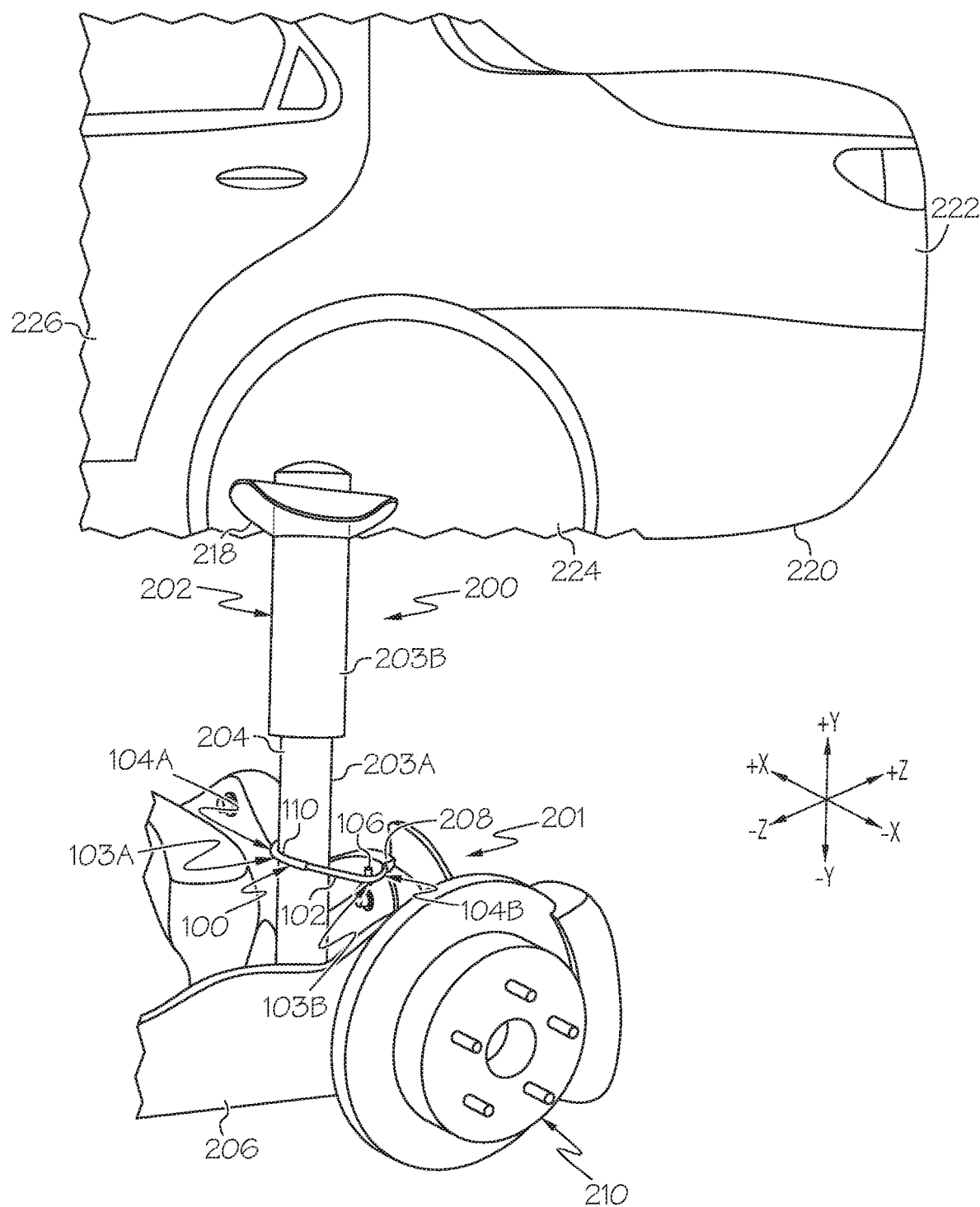
FIG. 5 schematically depicts the shock absorber support device of FIG. 1 coupled to the RSM frame assembly and the shock absorber of FIG. 3A, according to one or more embodiments shown or described herein.
Figure 6:
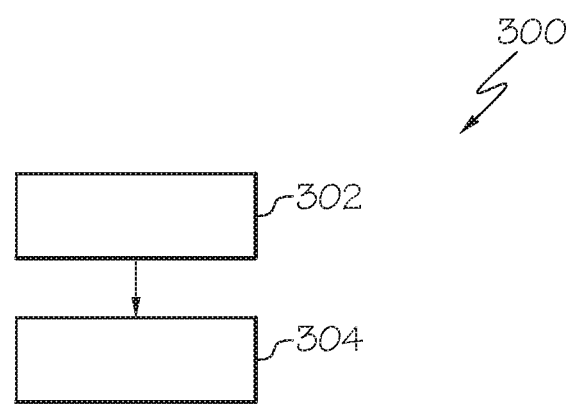
FIG. 6 depicts a method of using the shock absorber support device of FIG. 1, according to one or more embodiments shown or described herein.

Referring now to FIG. 6, a flow chart depicting a method 300 for assembling a RSM frame assembly 201 including a shock absorber 202 with a vehicle body 220 using a shock absorber support device 100 (as illustrated in FIGS. 3-5) is depicted. It is noted that while a number of steps are shown in a specific order, embodiments may include a greater or fewer number of steps in varying orders without departing from the scope of the present disclosure. To begin, at step 302 the method 300 may include engaging the lower cylinder 203A of the shock absorber 202 with the shock absorber hooking portion 104A coupled to the first end 103A of the elongated body 102 of the shock absorber support device 100. For example, and with reference to FIGS. 3-5, the shock absorber hooking portion 104A may be removably coupled to the lower cylinder 203A of the shock absorber 202 by hooking the shock absorber hooking portion 104A around the lower cylinder 203A. As noted above, the inner radius 112 of the shock absorber hooking portion 104A may correspond to the outer radius 205 of the lower cylinder 203A to ensure a tight fit to prevent the shock absorber 202 from coming loose during the assembly process.

Referring again to FIG. 6, step 304 may include engaging a portion of the RSM frame assembly 201 (e.g., the RSM upper arm 208 and/or the RSM frame 206) with an RSM frame hooking portion 104B coupled to a second end 103B of the elongated body 102 of the shock absorber support device 100. Engagement of both the shock absorber 202 and the RSM frame assembly 201 holds the shock absorber 202 at a predetermined position and prevents the shock absorber 202 from moving once coupled to the shock absorber support device 100. The method 300 may further include abutting the anti-rotation tab 106 against the RSM frame assembly 201, to prevent rotation of the elongated body 102, as described above.

Once the shock absorber 202 is secured with the shock absorber support device 100, the RSM frame assembly 201 may be raised (e.g., with a lifting device) into a vehicle body 220 for attachment thereto. Once the RSM frame assembly 201 is secured to the vehicle body 220, the RSM frame hooking portion 104B may be removed the RSM frame assembly 201. With the RSM frame hooking portion 104B disengaged from the RSM frame assembly 201, the shock absorber hooking portion 104A may be disengaged from the lower cylinder 203A of the shock absorber 202. With the shock absorber support device 100 removed, the shock absorber 202 may be secured to the vehicle body 220 via bracket 218.

It should now be understood that embodiments described herein are directed to a shock absorber support device for holding a shock absorber of a rear suspension member (RSM) in a predetermined position during assembly of a vehicle. The shock absorber support device may include a shock absorber hooking portion and an RSM frame hooking portion configured to releasably engage a cylinder of the shock absorber and a portion of an RSM frame assembly, respectively, to hold the shock absorber support device in a predetermined position relative to the RSM frame assembly for mounting within a vehicle body. In some embodiments, a shock absorber hooking portion of the shock absorber support device may be coated in a non-abrasive coating to prevent surface defects on the shock absorber cylinder. The hook design of the shock absorber hooking portion and the RSM frame hooking portion may inhibit the shock absorber support device from becoming dislodged during the assembly of the RSM to the vehicle body. For example, the shock absorber may be pivotally secured to an RSM frame of the RSM at a pivot point. A natural inclination of an unsupported shock absorber may be to pivot toward the ground. Accordingly, when the shock absorber support device is assembled to both the RSM Frame and the shock absorber, the shock absorber support device may be placed in tension by the pivoting motion of the shock absorber, which may reliably secure the shock absorber at a predetermined position. That is, the engagement of both the shock absorber and the portion of the RSM frame assembly with the shock absorber support device holds the shock absorber at a predetermined position. Accordingly, accidental contact of the shock absorber with the vehicle body during assembly may be avoided.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A shock absorber support device for supporting a shock absorber coupled to a rear suspension member (RSM), the shock absorber support device comprising:
    an elongated body extending between a first end and a second end;
    a shock absorber hooking portion coupled to the first end, wherein the shock absorber hooking portion is configured to releasably engage a cylinder of a shock absorber;
    an RSM frame hooking portion coupled to the second end, wherein the RSM frame hooking portion is configured to releasably engage a portion of an RSM frame assembly; and
    an anti-rotation tab coupled to the second end of the elongated body, the anti-rotation tab having a length that is greater than a thickness of the elongated body and an engagement surface arranged perpendicular to the elongated body, wherein engagement of both the shock absorber and the portion of an RSM frame assembly prevents the shock absorber from moving.

2. The shock absorber support device of claim 1, wherein the anti-rotation tab is secured to the elongated body at a center point of the length of the anti-rotation tab.

3. The shock absorber support device of claim 1, wherein the shock absorber hooking portion is coated in a non-abrasive coating.

4. The shock absorber support device of claim 1, wherein the shock absorber hooking portion has an inner radius that corresponds to an outer radius of the cylinder of the shock absorber.

5. A method of supporting a shock absorber coupled to a rear suspension member (RSM) during assembly of the RSM to a body of a vehicle, the method comprising:
    providing a shock absorber support device, the shock absorber support device comprising:
        an elongated body extending between a first end and a second end;
        a shock absorber hooking portion coupled to the first end; and
        an RSM frame hooking portion coupled to the second end,
    engaging a cylinder of the shock absorber with the shock absorber hooking portion; and
    engaging a portion of an RSM frame assembly of the RSM with the RSM frame hooking portion to prevent the shock absorber from moving.

6. The method of claim 5, further comprising abutting an anti-rotation tab against the portion of the RSM frame assembly, wherein the anti-rotation tab is coupled to the second end of the elongated body of the shock absorber support device.

7. The shock absorber support device of claim 1, wherein the RSM frame hooking portion is arranged within a gap formed between an RSM upper arm of the RSM frame assembly when the shock absorber support device is engaged with the shock absorber.

8. The shock absorber support device of claim 7, wherein the anti-rotation tab abuts against the RSM upper arm when the shock absorber support device is engaged with the shock absorber.

* * * * *